| United States Patent Office | 2,801,978
Patented Aug. 6, 1957 |

2,801,978

AMMONIA-CONTAINING DETERGENTS

Jacob Lincoln Perlman, Albany, N. Y., assignor to B. T. Babbitt, Inc., New York, N. Y., a corporation of New York No Drawing. Application November 2, 1956,
Serial No. 619,949

7 Claims. (Cl. 252—137)

This invention relates to a detergent or cleaning preparation, and more particularly to an ammonia containing cleanser. In this specification all percentages, unless otherwise stated, are on a weight basis.

Dilute aqueous solutions of ammonia, usually containing about 5% of ammonia, are widely used as mild all-purpose detergents. Such solutions have a number of disadvantages among which may be mentioned the following:

1. They require the packaging and transportation of large quantities of water, i. e., about 95% of the product is water, thus involving the expense to the consumer of the cost of transporting this water content; furthermore, for a given quantity of effective ammonia constituent the solution occupies a relatively large volume, and, hence, requires a relatively large space for its storage.

2. They are toxic to humans, so much so that containers must be labeled with skull and crossbones.

3. They have a strong objectionable ammonia odor.

4. When the containers are opened or the closures for the containers loosened the ammonia escapes at a relatively rapid rate with consequent loss of ammonia and diminution of the ammonia concentration of the solution; upon standing the liquid product invariably loses activity with time.

5. In the event of accidental breakage of the container, the liquid invariably causes considerable damage to contacted surfaces and emit disagreeable fumes.

6. The allowable ammonia concentration of the aqueous solution is such that only very dilute solutions, seldom in excess of 5% can be prepared; the solutions as now marketed do not permit of the preparation of more concentrated solutions, should such more concentrated solutions be desired to effect the cleaning of materials requiring the same for efficient cleaning action.

While solid ammonia-containing products have been suggested, chiefly ammonium sulfate-containing products, usually in admixture with soda ash or sodium bicarbonate and having an ammonia content of from 0.5% to 2%, such solid products have not replaced to any appreciable extent the aqueous ammonia solutions heretofore used notwithstanding the objections to such solutions. Solid ammonia-containing products heretofore suggested for the most part are mild washing sodas of the non-volatile type which for psychological purposes have an ammoniacal odor when dissolved in water.

Ammonium bicarbonate has also been suggested for use as a component in cleaning compounds. However, to the best of my knowledge and belief, ammonium bicarbonate has not been packaged for use as a household detergent probably because it readily decomposes to form ammonia, water and carbon dioxide, the water thus produced resulting in caking of the residual material.

It is among the objects of this invention to provide a mild all-purpose detergent in solid, granular form having a concentration of ammonia substantially in excess of 5%, which is stable, free-flowing, non-caking and much less toxic than the heretofore known aqueous ammonia solutions; which can be used to prepare an aqueous solution of any desired concentration, within limits, including concentrations well above 5% ammonia; which is used as a cleaner leaves no residue; the fumes of which are much milder than the fumes from liquid ammonia solutions, although the actual ammonia concentration may be equal to or even greater than that of the liquid ammonia solution; the strength of which is not effected by prolonged storage, as long as the product remains in solid form; which dissolves readily in water to produce an efficient mild cleansing solution; which is, for all practical purposes, harmless to surfaces with which it comes in contact, say, upon accidental breakage; and which, when placed in an aqueous solution, gradually and readily releases the ammonia, so that the resulting solution is eminently satisfactory for use as a mild cleanser.

The detergent product embodying this invention comprises as its essential constituents from 87% to 98.9% ammonium bicarbonate ($NH_4HCO_3$) and from 1% to 3% of an anhydrous alkali metal polyphosphate, the constituents being in finely divided or granular form so that the resultant mixture is free-flowing. This invention includes detergent products consisting of ammonium bicarbonate and an anhydrous alkali metal polyphosphate, in which case the proportions of these constituents are from about 97% to 99% ammonium bicarbonate and from about 1% to about 3% of the anhydrous alkali metal polyphosphate. Preferably, however, the detergent product also contains a finely divided dry solid surface active agent which imparts sudsing properties to the aqueous solutions made with the product. Such surface active agent may be present in amount of from 0.1% to about 10%, preferably from 0.1% to about 2% of the total product. Accordingly, when a surface active agent is incorporated in the product, the constituents may be present in the proportions of from about 87% to about 98.9%, preferably from about 94% to about 98.9%, ammonium bicarbonate; from about 1% to about 3% anhydrous alkali metal polyphosphate; and from about 0.1% to about 10%, preferably from about 0.1% to about 2% surface active agent. It will be understood that the product may also contain small amounts of additives, such as bleaches, e. g. sodium perborate ($NaBO_3 \cdot 4H_2O$), alkali metal persulphates, such as potassium monopersulfate ($KHSO_5$), sodium percarbonate ($2Na_2CO_3 \cdot 3H_2O_2$), and Halane (1,3-dichloro-5,5 dimethyl hydantoin), trichlorocyanuric acid, and dichlorocyanuric acid. If it is desired to impart a particular color to the product a dye may be added for this purpose.

As the ammonium bicarbonate constituent of the product, the ammonium bicarbonate of commerce may be used having a particle size within the range above noted. As the anhydrous alkali metal polyphosphate, sodium, potassium or lithium polyphosphates, including the tripolyphosphate and pyrophosphate, or mixtures thereof may be used. The preferred anhydrous alkali metal polyphosphates, chiefly for reasons of economy and ready availability, are sodium tripolyphosphate ($Na_5P_3O_{10}$) and tetrasodium pyrophosphate ($Na_4P_2O_7$). Particularly preferred is a mixture of sodium tripolyphosphate and tetrasodium pyrophosphate in approximately equal proportions.

As the surface active agent the following are preferred:

Alkyl aryl sulfonates containing from 8 to 20 carbon atoms in the alkyl chain, such, for example, as the commercial products sold under the trade names Ultrawet, Santomerse and Nacconol. A preferred member of this class is sodium dodecyl benzene sulfonate.

Alkyl sulfates containing from 6 to 20 carbon atoms in the alkyl chain, such, for example, as the commercial products sold under the trade names: Duponol, Stepanol, and Sipon. Specific examples of this type of surface active agents are the sodium salts of mixed coconut fatty acid sulfates and sodium lauryl sulfate.

Sulfated and sulfonated aliphatic amides and aliphatic amines containing from 8 to 20 carbon atoms, such, for example, as the commercial product offered under the brand name of Igepon T, which is sodium oleyl methyl tauride salt. Other examples of such products are the sodium salts of condensation products of fatty acid halides and methyl taurine.

Sulfated and sulfonated esters containing from 6 to 20 carbon atoms in the aliphatic chain, synthesized as, for example, by esterifying oleyl chloride with hydroxy ethane sulfonic acid, with subsequent neutralization to the sodium salt. Such products are offered in the trade as Igepon A, Arctic Syntex A or Antaron N–185.

Alkyl sulfonates containing from 8 to 20 carbon atoms in the alkyl chain, such, for example, as the commercial products sold under the brand name Duponol MP 189, and Nytron. An example of this type of product is sodium dodecyl sulfate.

The product of this invention may be made by mixing finely divided ammonium bicarbonate with the finely divided anhydrous alkali metal polyphosphate and with or without the addition of the surface active agent in the proportions to produce a final product having the constituents within the range of proportions hereinabove given. When producing a product containing a surface active agent, it is preferred to add the alkali metal polyphosphate to a slurry of the surface active agent, then heat the mixture to dryness, grind the resultant dry mixture to a finely divided condition, and then mix this anhydrous dried material with finely divided ammonium bicarbonate in the proportions to produce the product containing the constituents within the range above noted.

It is important that the alkali metal polyphosphate in the final product be in an anhydrous condition. Surprisingly, it has been found that the use of the anhydrous alkali metal polyphosphate results in an ammonia-containing product which is free-flowing and non-caking. Furthermore, the polyphosphates result in a preparation which, when added to water, has an alkalinity causing the ammonia to be released readily and gradually with consequent production of an efficient mild cleansing solution leaving no residue.

Products of the invention containing 99% ammonium bicarbonate contain about 21% ammonia in combined form. Those containing smaller amounts of ammonium bicarbonate contain correspondingly smaller amounts of combined ammonia. Products containing the minimum amount of about 87% ammonium bicarbonate contain about 18.5% ammonia in combined form. Hence, the product can be used to produce ammonia solutions of any desired concentration within limits, including concentrations of above 5%.

The product of this invention dissolves readily in water, particularly warm water, e. g., temperatures of about 40–50° C. The dissolution of one part of the product in three parts of water will produce a solution equivalent of household ammonia, now sold in undiluted form. By using less water, a more concentrated solution results. Surprisingly, the odor of the product is not as harsh or as strong as liquid ammonia because the ammonia is temporarily combined and is only released gradually.

The following examples are given for purposes of illustration only. It will be understood the invention is not limited to these examples.

EXAMPLE I

| | Percent |
|---|---|
| Ammonium bicarbonate | 97.0 |
| Sodium tripolyphosphate | 1.5 |
| Tetrasodium pyrophosphate | 1.5 |
| Total | 100 |

EXAMPLE II

| | |
|---|---|
| Ammonium bicarbonate | 99.0 |
| Sodium tripolyphosphate | 0.5 |
| Tetrasodium pyrophosphate | 0.5 |
| Total | 100 |

EXAMPLE III

| | |
|---|---|
| Ammonium bicarbonate | 98.0 |
| Sodium tripolyphosphate | 0.5 |
| Tetrasodium pyrophosphate | 0.5 |
| Surface active agent (sodium dodecyl benzene sulfonate) | 1.0 |
| Total | 100 |

EXAMPLE IV

| | |
|---|---|
| Ammonium bicarbonate | 97.0 |
| Sodium tripolyphosphate | 3.0 |
| Total | 100 |

EXAMPLE V

| | |
|---|---|
| Ammonium bicarbonate | 98.0 |
| Sodium tripolyphosphate | 1.5 |
| Surface active agent (sodium dodecyl benzene sulfonate) | 0.5 |
| Total | 100 |

Each of the above Examples III and V involving the presence of a surface active agent is prepared by adding the polyphosphate to an aqueous slurry of the surface active agent, drying the resultant mixture to produce an anhydrous mixture, then grinding it to a finely divided form so that it will flow freely, and mixing the ground mixture with the finely divided ammonium bicarbonate in the proportions indicated in the example. In the case of Examples I, II and IV the constituents may be mixed in the dry finely divided form in the proportions indicated to produce the products.

In the above examples the substitution of other anhydrous polyphosphates, such as those of potassium or lithium or a mixture thereof for the particular polyphosphate employed in the examples gives a dry, free-flowing, non-caking, mild, all-purpose detergent.

As noted, if desired, a bleach and dye or other coloring matter may be added to impart to the product any desired color and bleaching, as well as detergent properties.

In use the detergent preparation of this invention has been found to have the following advantages:

1. As compared with household liquid ammonia solutions heretofore commonly employed, the product of this invention occupies ¼ the space and has ⅓ the weight and yet provides an ammonia containing product having from three to four times the ammonia content of the liquid ammonia.

2. In the event of accidental breakage of the container the product of this invention results only in releasing a mild odor. It can easily be brushed or swept up with no damage to the contacted surfaces. The product releases its activity only upon being dissolved in water.

3. The product when dissolved in water produces a sudsy cleaning or washing solution; the sudsing properties are chiefly due to the surface active agent.

4. The fumes from the product, while definitely those of ammonia, are much milder than the fumes of liquid ammonia and this though the actual ammonia content is equal to or more than that of liquid ammonia.

5. A more concentrated ammonia solution, if needed, can be prepared. The product of this invention contains from about 15% to about 21% ammonia, depending on the amount of ammonium bicarbonate present, and thus, on an equal weight basis has from three to four times the ammonia content as the liquid household ammonias now commonly used which have an ammonia concentration of about 5%.

6. The product of this invention is much less toxic and is relatively safe around the household.

7. The strength of the product is not affected by prolonged storage periods, as long as it remains in powdered form.

8. In aqueous solution the product decomposes readily and gradually, liberating ammonia and carbon dioxide, the ammonia in a form which is effective as a cleaner. The cleaning action actually is greater than the sum total of the cleaning action of the individual constituents, i. e., there is a synergistic action between the ammonium bicarbonate, the anhydrous alkali metal phosphate and the surface active agent, if present. Moreover, the ammonia and carbon dioxide escape into the atmosphere and none of the other cleansing constituents are present in sufficient quantity to produce an appreciable residue. Hence, it is not necessary to rinse or wipe with a damp cloth surfaces or objects cleansed with solutions of the product of this invention.

The following comparative test data demonstrates that the constituents in the product of this invention have a synergistic detergent or cleansing action, i. e., the detergent properties of the product, surprisingly, is greater than the sum total of the detergent action of the constituents. These comparative tests involved a determination of the detergency of tap water solutions of the following: (1) A mixture containing 97% ammonium bicarbonate, 3% sodium tripolyphosphates consisting of equal proportions of tetrasodium pyrophosphate and sodium tripolyphosphate (Example I above); (2) ammonium bicarbonate alone; (3) the above-mentioned polyphosphates (the same mixture of these polyphosphates) alone; (4) ammonia alone; (5) ammonia mixed with the above-mentioned polyphosphates (the same mixture of polyphosphates).

These tests were carried out under truly comparative conditions. All tests involved dissolving the material in tap water (using tap water from the same source for all tests) to produce a solution having a concentration containing, in the case of the ammonium bicarbonate containing preparations, 0.5% by weight of ammonium bicarbonate, which is the recommended concentration for household or other use of the product of this invention.

In those tests involving ammonia, the ammonia was dissolved in water to produce a solution having an equivalent molecular amount of ammonia to that contained in the ammonium bicarbonate containing solutions, namely, 0.110% ammonia.

All tests involved the use of fiberglass tape to which was applied a soil mixture as follows:

1.3 gms.—Oil dag (Acheson Colloid Co., Port Huron, Michigan)
40.0 gms.—Nujol
15.0 gms.—Edible mutton tallow (Swift & Co.)
Carbon tetrachloride to 1 liter.

This soil mixture was mixed in a Waring type blender and the fiberglass tape drawn through the soil solution thus produced at a steady rate and then through a pair of neoprene covered motor driven rollers which wrung out excess soil solution. The soiled strips were then stretched horizontally and dried completely in air. They were then cut into swatches 2¾" long. The soiled swatches were processed in a Cleanometer, giving a 1" vertical stroke at the rate of 100 strokes per minute. The soiled swatches treated with each of the detergents, in these detergency tests, were run for 1500 strokes.

In each case, the test detergent solution was made up to the concentration noted above in two liters of tap water at 120° F. and placed in a three-liter stainless steel beaker in which the washing procedure in the Cleanometer was effected while the beaker was in a constant temperature bath. After thus washing the swatches, they were removed, given a quick rinse in warm tap water, blotted with paper toweling and placed in a forced draft oven at 105° C. until dry.

Reflectance readings were then made on the washed swatches, using a Model 610 Photovolt Reflectometer. The meter was standardized at 100% white against the unsoiled fiberglass tape. It was also adjusted at 0% reflectance against the soiled but unwashed tape. In this manner, the washed pieces may be read directly in percent soil removal. One reflectance reading was made on each side of two washed swatches of each material tested and the average of the readings was reported as the value for the material under test.

The results are given in Table I which follows:

Table I

| Test No. | Material Tested | Percent Soil Removal |
|---|---|---|
| a | (1) Polyphosphate NH$_4$HCO$_3$ | 33.4 |
| b | (2) NH$_4$HCO$_3$ | 11.9 |
| c | (3) Polyphosphate alone | 12.8 |
| d | (4) NH$_3$ alone | 5.1 |
| e | (5) NH$_3$ and polyphosphate | 10.8 |

From the above data, it is evident that the ammonium bicarbonate alkali metal polyphospate mixture shows marked positive synergistic action (+35%). Thus, while ammonium bicarbonate alone has a detergency value of 11.9 and the mixed polyphosphates alone a detergency value of 12.8, making a total of 24.7, the mixture of ammonium bicarbonate and mixed polyphosphates has a detergency value of 33.4, 8.7 greater than the sum total of the individual values.

Surprisingly, the detergency value of the mixture of ammonium bicarbonate and sodium polyphosphates is markedly greater than that of a mixture containing ammonia and these mixed polyphosphates, more than three times as great.

The data in Table II, which follows, involving comparative tests, using the same procedure as above, demonstrate that products embodying this invention show surprising synergism throughout the range of 1% to 3% alkali metal polyphosphate. In these tests the polyphosphates used were a mixture of sodium pyrophosphate and sodium tripolyphosphate in equal proportions. The soil removal tests were carried out in a water solution concentration of 0.5% ammonium bicarbonate. In the table, the abbreviation ABC means ammonium bicarbonate.

Table II

| Composition, Percent | | Percent Soil Removal | Percent Soil Removal of Components | | Percent Synergism |
|---|---|---|---|---|---|
| ABC | Phosphate | | ABC | Phosphate | |
| 100 | 0 | 8.6 | 8.6 | | |
| 99 | 1 | 20.9 | 8.6 | 2.8 | +83 |
| 97 | 3 | 27.3 | 8.6 | 9.6 | +50 |

From the above data it will be noted that whereas the solution containing ammonia and the detergent shows no synergism and results in a detergency value lower than the sum of the detergency values of the components, a solution of the product of this invention surprisingly shows marked synergism of the components.

The cleanser of this invention is eminently satisfactory for use in cleaning windows, mirrors, painted surfaces, walls, woodwork and for all household cleaning purposes, filling the need wherever a mild cleaning action is desired and where troublesome detergent residues are undesirable.

This application is a continuation-in-part of my copending application Serial No. 421,175, which application (but not the invention thereof) has been abandoned.

Since certain changes may be made in the above cleaner and different embodiments of the invention could be made without departing from the scope thereof, it is intended that all matters contained in the above description shall be interpreted as illustrative and not in a limiting sense.

What is claimed is:

1. A dry finely-divided solid ammonia-containing detergent preparation which is stable, free-flowing and non-caking and contains as essential constituents from about 87% to about 99% of ammonium bicarbonate, from about 1% to about 3% of anhydrous alkali metal polyphosphate, and from 0% to 12% of a dry solid surface active agent from the group consisting of alkyl aryl sulfonates containing from 8 to 20 carbon atoms in the alkyl chain, alkyl sulfates containing from 6 to 20 carbon atoms in the alkyl chain, sulfated aliphatic amides containing from 8 to 20 carbon atoms, sulfated aliphatic amines containing from 8 to 20 carbon atoms, sulfonated aliphatic amides containing from 8 to 20 carbon atoms, sulfonated aliphatic amines containing from 8 to 20 carbon atoms, sulfated aliphatic esters containing from 6 to 20 carbon atoms, sulfonated aliphatic esters containing from 6 to 20 carbon atoms, and alkyl sulfonates containing from 8 to 20 carbon atoms.

2. A dry finely-divided solid ammonia-containing detergent preparation, which is stable, free-flowing and non-caking and contains from about 97% to about 99% of ammonium bicarbonate and from about 1% to about 3% anhydrous alkali metal polyphosphate.

3. The detergent preparation as defined in claim 2 in which the anhydrous alkali metal polyphosphate consists of a mixture of sodium tripolyphosphate and tetrasodium pyrophosphate in approximately equal proportions.

4. A detergent preparation as defined in claim 1 which also contains from about 0.1% to 10% of a dry solid surface active agent which imparts sudsing properties to aqueous solutions made with said preparation, said surface active agent being from the group consisting of alkyl aryl sulfonates containing from 8 to 20 carbon atoms in the alkyl chain, alkyl sulfates containing from 6 to 20 carbon atoms in the alkyl chain, sulfated aliphatic amides containing from 8 to 20 carbon atoms, sulfated aliphatic amines containing from 8 to 20 carbon atoms, sulfonated aliphatic amides containing from 8 to 20 carbon atoms, sulfonated aliphatic amines containing from 8 to 20 carbon atoms, sulfated aliphatic esters containing from 6 to 20 carbon atoms, sulfonated aliphatic esters containing from 6 to 20 carbon atoms, and alkyl sulfonates containing from 8 to 20 carbon atoms.

5. A dry finely-divided solid ammonia-containing detergent preparation which is stable, free-flowing and non-caking and contains at least about 87% ammoium bicarbonate, from about 1% to about 3% anhydrous alkali metal polyphosphate, and from 0% to 12% of a dry solid surface active agent from the group consisting of alkyl aryl sulfonates containing from 8 to 20 carbon atoms in the alkyl chain, alkyl sulfates containing from 6 to 20 carbon atoms in the alkyl chain, sulfated aliphatic amides containing from 8 to 20 carbon atoms, sulfated aliphatic amines containing from 8 to 20 carbon atoms, sulfonated aliphatic amides containing from 8 to 20 carbon atoms, sulfonated aliphatic amines containing from 8 to 20 carbon atoms, sulfated aliphatic esters containing from 6 to 20 carbon atoms, sulfonated aliphatic esters containing from 6 to 20 carbon atoms, and alkyl sulfonates containing from 8 to 20 carbon atoms.

6. A dry finely-divided solid ammonia-containing detergent preparation which is stable, free-flowing and non-caking and contains at least about 87% ammonium bicarbonate, from about 1% to about 3% anhydrous alkali metal polyphosphate, and from about 0.1% to 10% of a dry solid surface active agent which imparts sudsing properties to aqueous solutions made with said preparation, said surface acting agent being from the group consisting of alkyl aryl sulfonates containing from 8 to 20 carbon atoms in the alkyl chain, alkyl sulfates containing from 6 to 20 carbon atoms in the alkyl chain, sulfated aliphatic amides containing from 8 to 20 carbon atoms, sulfated aliphatic amines containing from 8 to 20 carbon atoms, sulfonated aliphatic amides containing from 8 to 20 carbon atoms, sulfonated aliphatic amines containing from 8 to 20 carbon atoms, sulfated aliphatic esters containing from 6 to 20 carbon atoms, sulfonated aliphatic esters containing from 6 to 20 carbon atoms, and alkyl sulfonates containing from 8 to 20 carbon atoms.

7. A dry finely-divided solid ammonia-containing detergent preparation which is stable, free-flowing and non-caking and contains from about 95% to about 98.9% ammonium bicarbonate, and from about 1% to about 3% of an anhydrous mixture of alkali metal tripolyphosphate and alkali metal pyrophosphate and about 0% to about 2% of a surface active agent from the group consisting of alkyl aryl sulfonates containing from 8 to 20 carbon atoms in the alkyl chain, alkyl sulfates containing from 6 to 20 carbon atoms in the alkyl chain, sulfated aliphatic amides containing from 8 to 20 carbon atoms, sulfated aliphatic amines containing from 8 to 20 carbon atoms, sulfonated aliphatic amines containing from 8 to 20 carbon atoms, sulfated aliphatic esters containing from 6 to 20 carbon atoms, sulfonated aliphatic esters containing from 6 to 20 carbon atoms, and alkyl sulfonates containing from 8 to 20 carbon atoms.

References Cited in the file of this patent

UNITED STATES PATENTS

| 1,869,235 | Bartling | July 26, 1932 |
| 2,394,321 | McGhie | Feb. 5, 1946 |
| 2,431,470 | Fawkes | Nov. 25, 1947 |

FOREIGN PATENTS

| 6,123 | Great Britain | of 1893 |
| 310,055 | Germany | Nov. 18, 1920 |
| 567,497 | Great Britain | Feb. 16, 1945 |